(12) United States Patent
Stifal et al.

(10) Patent No.: US 9,146,001 B2
(45) Date of Patent: Sep. 29, 2015

(54) ENDCAP MOUNTING SYSTEM FOR MOUNTING AUDIO/VISUAL DEVICES OR THE LIKE

(75) Inventors: Matthew W. Stifal, Portage, IN (US); James D. Walters, Saint Charles, IL (US)

(73) Assignee: Peerless Industries, Inc., Aurora, IL (US)

( * ) Notice: Subject to any disclaimer, the term of this patent is extended or adjusted under 35 U.S.C. 154(b) by 626 days.

(21) Appl. No.: 13/449,910

(22) Filed: Apr. 18, 2012

(65) Prior Publication Data

US 2013/0193092 A1     Aug. 1, 2013

Related U.S. Application Data

(63) Continuation-in-part of application No. 29/412,305, filed on Feb. 1, 2012, now Pat. No. Des. 675,213.

(51) Int. Cl.
| | |
|---|---|
| *A47F 7/00* | (2006.01) |
| *F16M 11/04* | (2006.01) |
| *F16M 11/24* | (2006.01) |
| *F16M 13/02* | (2006.01) |

(52) U.S. Cl.
CPC ............. *F16M 11/045* (2013.01); *F16M 11/24* (2013.01); *F16M 13/02* (2013.01)

(58) Field of Classification Search
CPC ..... F16M 11/04; F16M 11/24; F16M 11/041; F16M 11/043; F16M 11/045; F16M 11/046; F16M 13/02
USPC ................. 211/26, 26.2, 86.01, 87.01, 94.01, 211/94.02, 189, 190, 175, 207; 248/917, 248/921–924, 274.1, 284.1, 285.1, 292.13, 248/495
See application file for complete search history.

(56) References Cited

U.S. PATENT DOCUMENTS

| | | | | | |
|---|---|---|---|---|---|
| 5,472,103 | A | * | 12/1995 | Merl | 211/187 |
| 5,509,541 | A | * | 4/1996 | Merl | 211/103 |
| 5,641,081 | A | * | 6/1997 | Merl | 211/103 |
| 5,950,974 | A | * | 9/1999 | Hoffmann | 248/223.41 |
| 6,318,692 | B1 | * | 11/2001 | Cyrell | 248/317 |
| 6,659,295 | B1 | * | 12/2003 | De Land et al. | 211/187 |
| 7,100,780 | B1 | * | 9/2006 | VanCalbergh et al. | 211/94.01 |
| 7,300,029 | B2 | * | 11/2007 | Petrick et al. | 248/285.1 |
| D625,300 | S | | 10/2010 | Stifal et al. | |
| D634,311 | S | | 3/2011 | Stifal et al. | |
| 8,276,864 | B2 | * | 10/2012 | Ye et al. | 248/287.1 |
| 8,739,983 | B2 | * | 6/2014 | Sugarman | 211/85.7 |
| 2004/0007550 | A1 | * | 1/2004 | Leeman et al. | 211/189 |
| 2008/0093319 | A1 | * | 4/2008 | Stover et al. | 211/85.26 |
| 2009/0101608 | A1 | * | 4/2009 | Sloat | 211/94.01 |
| 2011/0198460 | A1 | | 8/2011 | Stifal et al. | |

* cited by examiner

*Primary Examiner* — Korie H Chan
(74) *Attorney, Agent, or Firm* — Foley & Lardner LLP

(57) ABSTRACT

A mounting assembly for attaching and supporting an audio/visual device. The mounting assembly includes a frame including at least one cross member, at least one side member, and a moving member; and a support assembly including a pair of spaced apart first members and a pair of spaced apart second members. Each second member is attachable to the audio/visual device. The first members are movably coupled to the at least one cross member and the second members are movably coupled to the first members. The moving member is configured to move relative to the cross and side members, such that the size of the frame is adjustable.

19 Claims, 16 Drawing Sheets

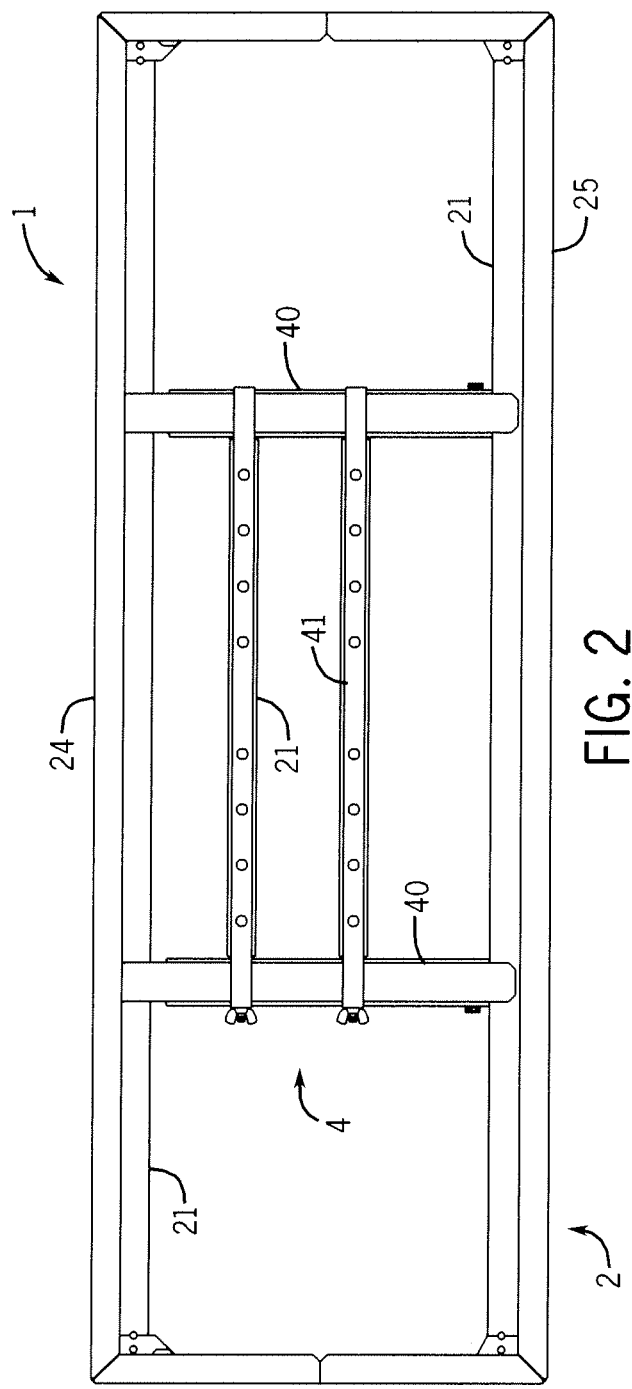
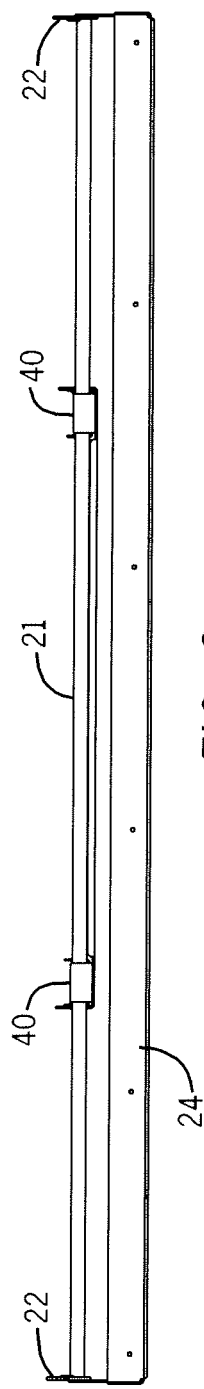
FIG. 2
FIG. 3

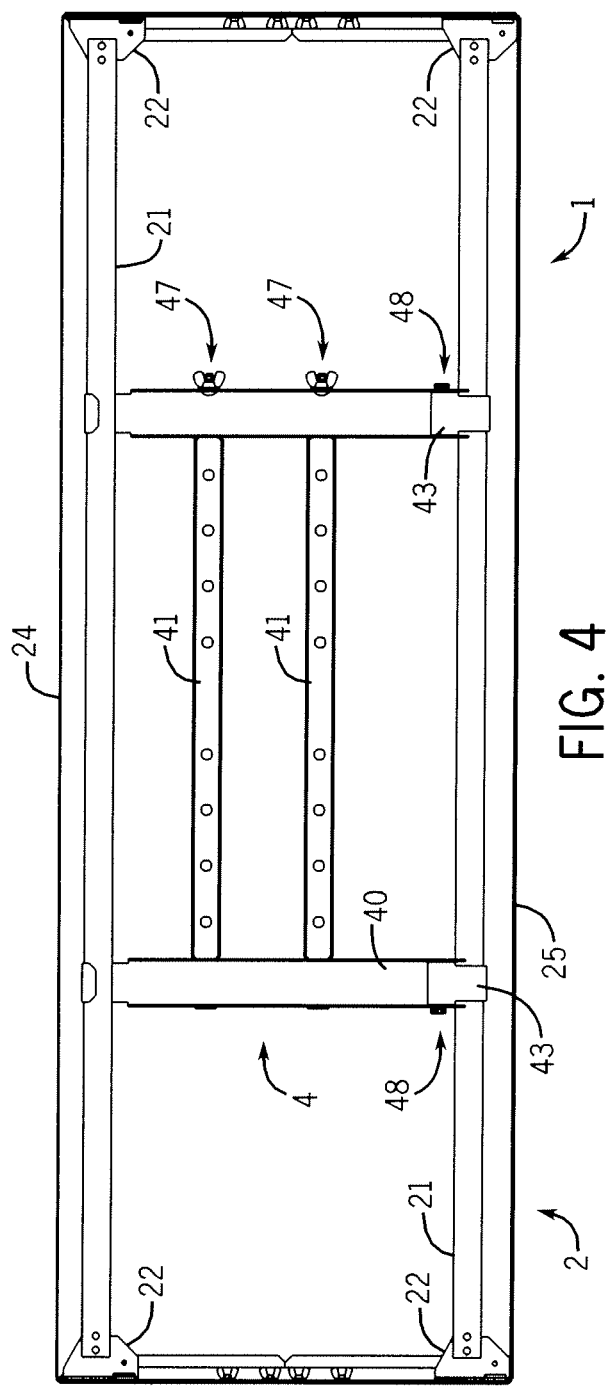
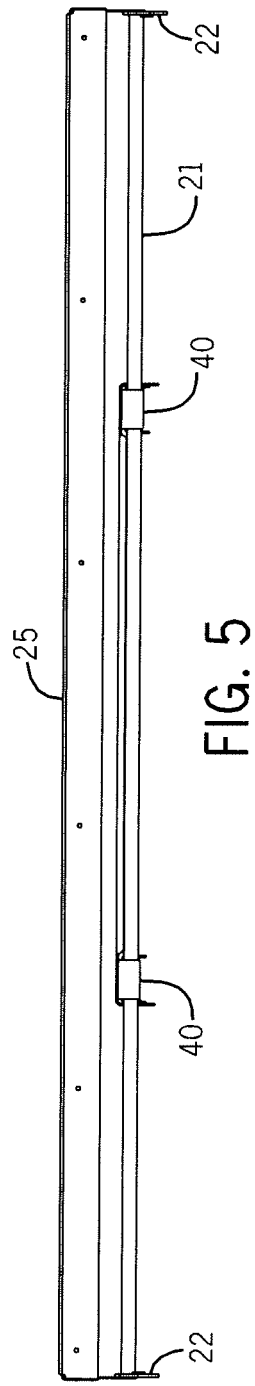
FIG. 4
FIG. 5

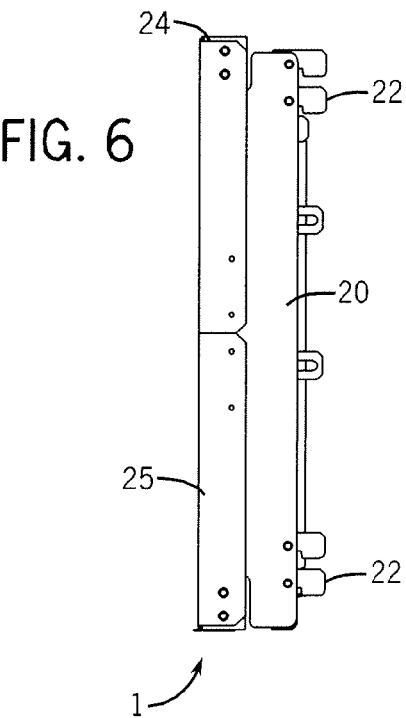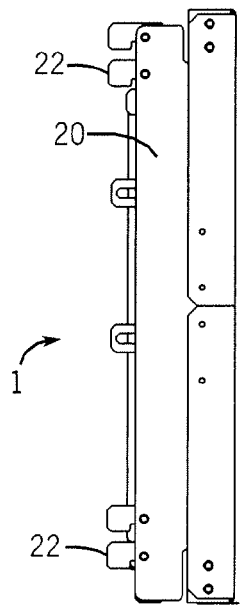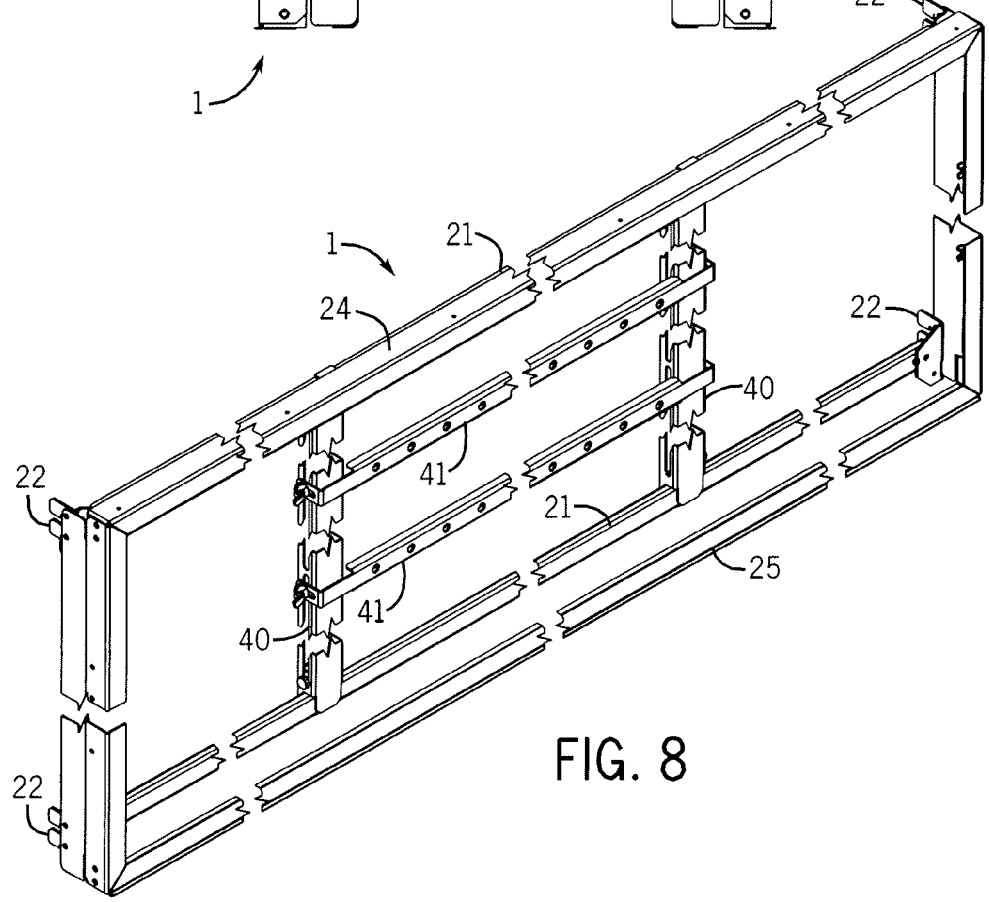

ENDCAP MOUNTING SYSTEM FOR MOUNTING AUDIO/VISUAL DEVICES OR THE LIKE

CROSS-REFERENCE TO RELATED APPLICATIONS

The present application is a continuation-in-part of U.S. patent application Ser. No. 29/412,305, filed Feb. 1, 2012 and entitled "MOUNTING SYSTEM FOR MOUNTING AUDIO/VISUAL DEVICES OR THE LIKE." The contents of this priority application are incorporated herein by reference in its entirety.

BACKGROUND

The present application relates generally to the field of mounting systems for audio/visual devices. More specifically, the present application relates to adjustable mounting systems configured to provide improved variable adjustability of the mounted device.

SUMMARY

One embodiment relates to a mounting assembly for attaching and supporting an audio/visual device. The mounting assembly includes a frame having at least one cross member, at least one side member, and a moving member; and a support assembly having a pair of spaced apart first members and a pair of spaced apart second members. Each second member is attachable to the audio/visual device. The first members are movably coupled to the at least one cross member and the second members are movably coupled to the first members. The moving member is configured to move relative to the cross and side members, such that the size of the frame is adjustable.

Another embodiment relates to a mounting assembly for attaching and supporting an audio/visual device. The mounting assembly includes a frame having a pair of spaced apart cross members interconnected with a pair of spaced apart side members; and a support assembly having a pair of spaced apart first members and a pair of spaced apart second members. Each second member includes at least one opening for attaching the audio/visual device thereto. The first members are movably coupled to the cross members and the second members are movably coupled to the first members.

Yet another embodiment relates to a mounting assembly for attaching to an endcap of a fixture and for supporting an audio/visual device mounted thereto. The mounting assembly includes a frame, a support assembly, and a cover. The frame includes a pair of spaced apart cross members. The support assembly includes a pair of spaced apart first members and a pair of spaced apart second members. Each second member is attachable to the audio/visual device. The first members are movably coupled to the cross members and the second members are movably coupled to the first members. The cover is configured to at least partially surround the mounting assembly, and the cross members are connected to the cover.

These and other features of the embodiments described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2 is a front view of the mounting assembly of FIG. 1.
FIG. 3 is a top view of the mounting assembly of FIG. 1.
FIG. 4 is a rear view of the mounting assembly of FIG. 1.
FIG. 5 is a bottom view of the mounting assembly of FIG. 1.
FIG. 6 is a right-side view of the mounting assembly of FIG. 1.
FIG. 7 is a left-side view of the mounting assembly of FIG. 1.
FIG. 8 is a partially broken perspective view of the mounting assembly of FIG. 1, with broken lines indicating that no particular length is required for the item in question.

DETAILED DESCRIPTION

Figure 1:
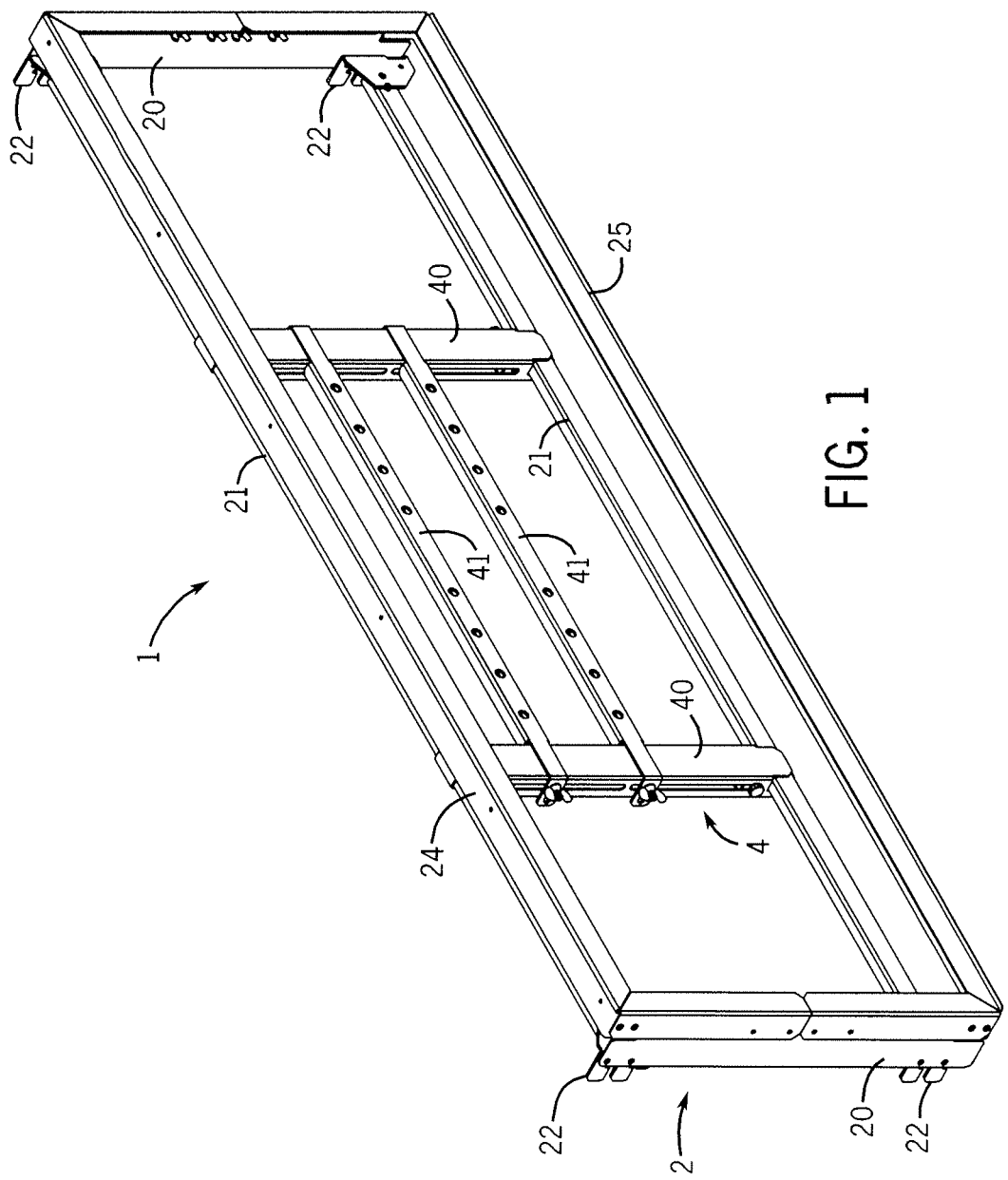
FIG. 1 is a perspective view of an exemplary embodiment of a mounting assembly shown in a collapsed configuration.

With general reference to the Figures, disclosed herein are various embodiments of mounting assemblies that are configured to provide support and adjustability to a device, such as an audio/display device. The mounting assemblies include a first assembly (e.g., support assembly) a second assembly (e.g., frame). The first assembly is configured to attach or mount the device thereto, such that the position of the device and first assembly may be adjusted relative to the second assembly. The first assembly also is adjustable to be able to mount different size devices to the same assembly. The second assembly may be configured to be a fixed frame structure or an expandable frame structure.

FIG. 1-16 illustrate an exemplary embodiment of a mounting assembly 1 that is configured to support a display device such as a flat panel television or other audio/visual device. For example, the mounting assembly 1 may be attached (e.g., coupled, connected) to a fixture, such as the fixture 9 shown in FIG. 28, where the mounting assembly 1 supports the audio/visual device 8. The mounting assembly 1 may be configured to attach to or be coupled to a portion of a fixture, such as an endcap of a fixture 9. This may advantageously allow for the audio/visual device to be coupled to the end of the fixture (e.g., to the endcap), which may utilize space that was previously vacant of any display device to more effectively optimize the use of as much of the surface area of the fixture as possible. For example, a typical fixture for a commercial establishment is elongated in shape with the longer opposing surfaces (i.e., lengths) potentially used for displaying devices a variety of items, while the ends of the fixtures typically having very limited usefulness, often only being able to include shelves or other limited display mechanisms. The mounting assemblies disclosed herein may be attached to these unutilized ends, such as through attachment to an endcap, to display additional devices therefrom to optimize the surface area available for displaying devices.

As shown, the mounting assembly 1 includes a frame 2 and a support assembly 4, where the frame 2 is configured to attach to an object (e.g., a fixture, an endcap of a fixture, etc.) to support the mounting assembly 1 and the support assembly 4 is configured to mount an audio/visual device thereto. The support assembly 4 may be slideable or otherwise movable relative to the frame 2, such as to change the relationship between the audio/visual device 8 and the frame 2. As shown, the support assembly 4 is slideably coupled to the frame 2, where the support assembly 4 may slide in a lateral direction between a first position and a second position, where the two positions correspond to two opposing ends of the frame 2, such as to adjust the position of the audio/visual device 8 mounted to the support assembly 4 relative to the frame 2 (and the fixture 9, such as to the endcap of the fixture 9).

The frame 2 may include one member or a plurality of members that are interconnected, such as through the use of fasteners, welding, a combination thereof, or any other suitable method. As shown, the frame 2 includes a pair of opposing side members 20 (e.g., vertical members) coupled to a pair of opposing cross members 21 (e.g., horizontal members) to form a generally rectangular shaped fixed frame structure. The side members 20 may be connected directly to the cross members 21 or may be interconnected to the cross members 21 through coupling members, such as corner brackets 22.

Figure 9:
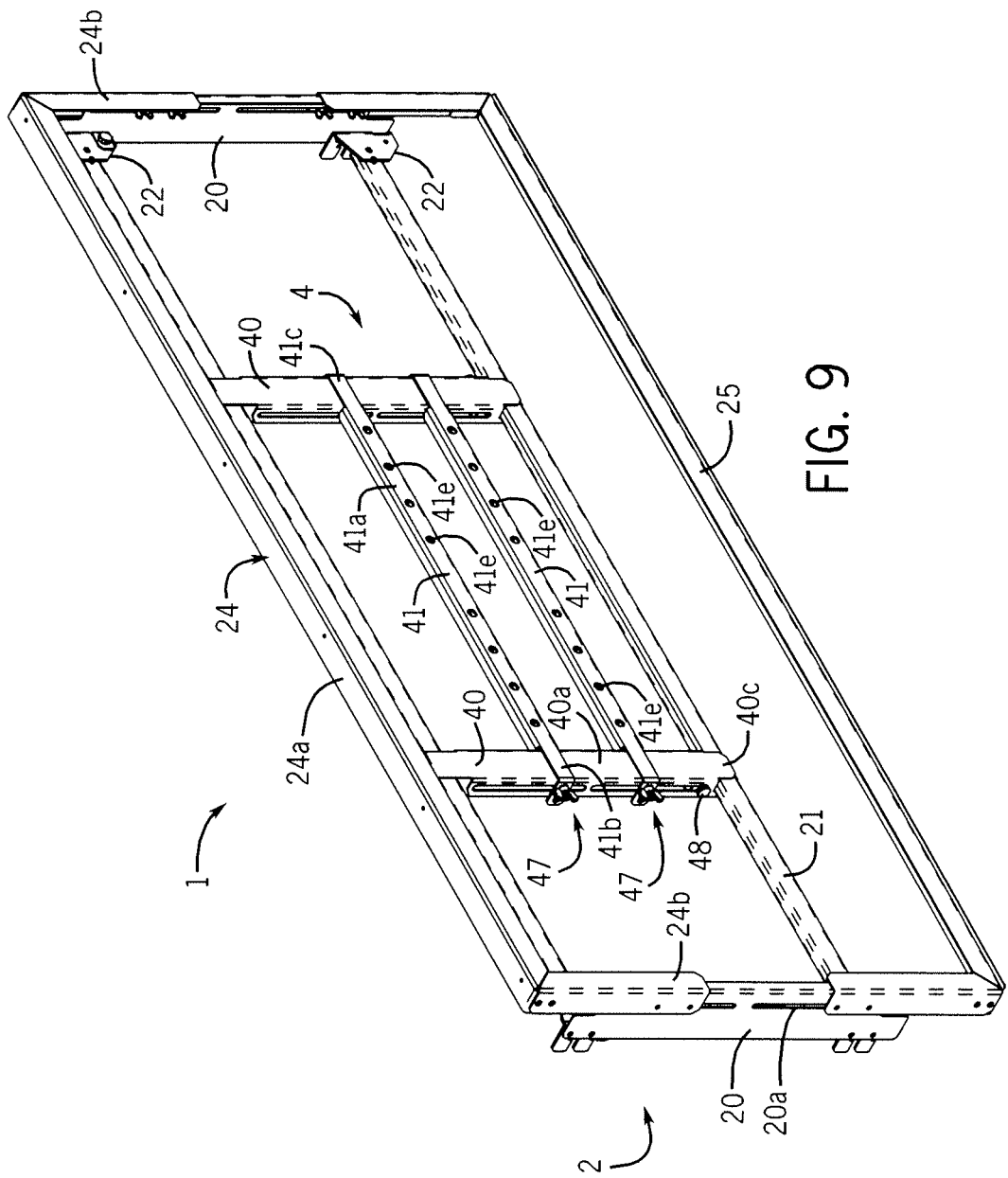
FIG. 9 is a front perspective view of the mounting assembly of FIG. 1 shown in an expanded configuration.

As shown in FIG. 9, the frame 2 may also include an upper moving member 24 (which may move, for example, via a sliding action) and a lower moving member 25 (which also may move, for example, via a sliding action) that form an outer frame structure that is configured to be expandable relative to the fixed frame structure. The upper moving member 24 may slide between a first, more collapsed position and a second, more expanded position relative to the fixed frame structure. The lower moving member 25 may slide between a first, more collapsed position and a second, more expanded position relative to the fixed frame structure. Thus, the frame 2 may be moved from a collapsed position to an expanded position by moving the upper moving member 24 in an upward direction relative to the fixed frame structure and by moving the lower moving member 25 in a downward direction relative to the fixed frame structure. The frame 2 may be moved back to the collapsed position from the expanded position by moving the upper moving member 24 in a downward direction and by moving the lower moving member 25 in an upward direction. It should be noted that the frame 2 may be positioned in various positions between the expanded and collapsed positions, such as by sliding one or both of the moving members 24, 25 to a position between their respective first and second positions.

Each member of the frame 2 may be configured as a flat plate, as a formed member, such as having a non-flat cross section (e.g., C-shaped, U-shaped, L-shaped, box-shaped, etc. cross-sections), or may have any suitable shape. For example, the side members 20 may have a generally L-shaped cross-section, such that upper and lower moving members 24, 25 may slide along the side members 20 in a nested arrangement. Thus, the upper and lower moving members 24, 25 may also have an L-shaped cross-section to provide the nested arrangement. As another example, the cross members 21 may have a tubular shape.

Each member of the frame 2 may also include one or more sections or portions. For example, the upper moving member 24 may include a central portion 24a and two end portions 24b, which may be integrally formed together or formed separately and coupled together using any suitable method. The end portions 24b of the upper moving member 24 may extend substantially parallel to each other and transverse to the central portion 24a from the two opposing ends of the central portion 24a.

Figure 13:
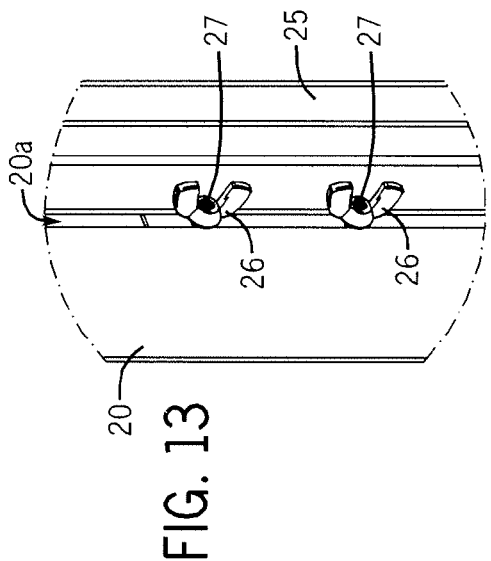
FIG. 13 is a detail view taken from FIG. 10.

The end portions 24b of the upper moving member 24 may have features that facilitate the moving (e.g., sliding) of the upper moving member 24 relative to the fixed frame structure. For example, the end portions 24b may include posts, tabs, or any other suitable feature that engage slots or other openings in the fixed frame structure to guide the movement of the upper moving member 24 relative to the fixed frame structure. As another example, the end portion 24b may include holes or other openings that are configured to receive posts, fasteners, or any other suitable member that may slideably couple the upper moving member 24 to the fixed frame structure, such as to the side members 20. For this arrangement, the frame 2 may include a nut 26 that receives a fastener 27, as shown in FIG. 13, to slideably couple the moving member (e.g., the lower moving member 25) to the side member 20. It should be noted that the lower moving member 25 may be configured symmetrically opposite to the upper moving member 24, or may be configured having any suitable configuration, which may be different than the upper moving member 24.

The side member 20 may also include an opening, such as a slot 20a as shown in FIG. 13, to receive the fastener 27, to allow the fastener 27 to move in the slot 20a when moving the moving member (e.g., the lower moving member 25) relative to the side member 20. The length of the slot 20a may tailor the amount of expandability of the outer frame structure relative to the fixed frame structure. Accordingly, different frames may have different sized slots. The side member 20 may also include additional openings or other features to facilitate assembly of the frame 2. For example, the side member 20 may include holes configured to receive fasteners therein to attach the corner bracket 22 to the side member 20

Figure 10:
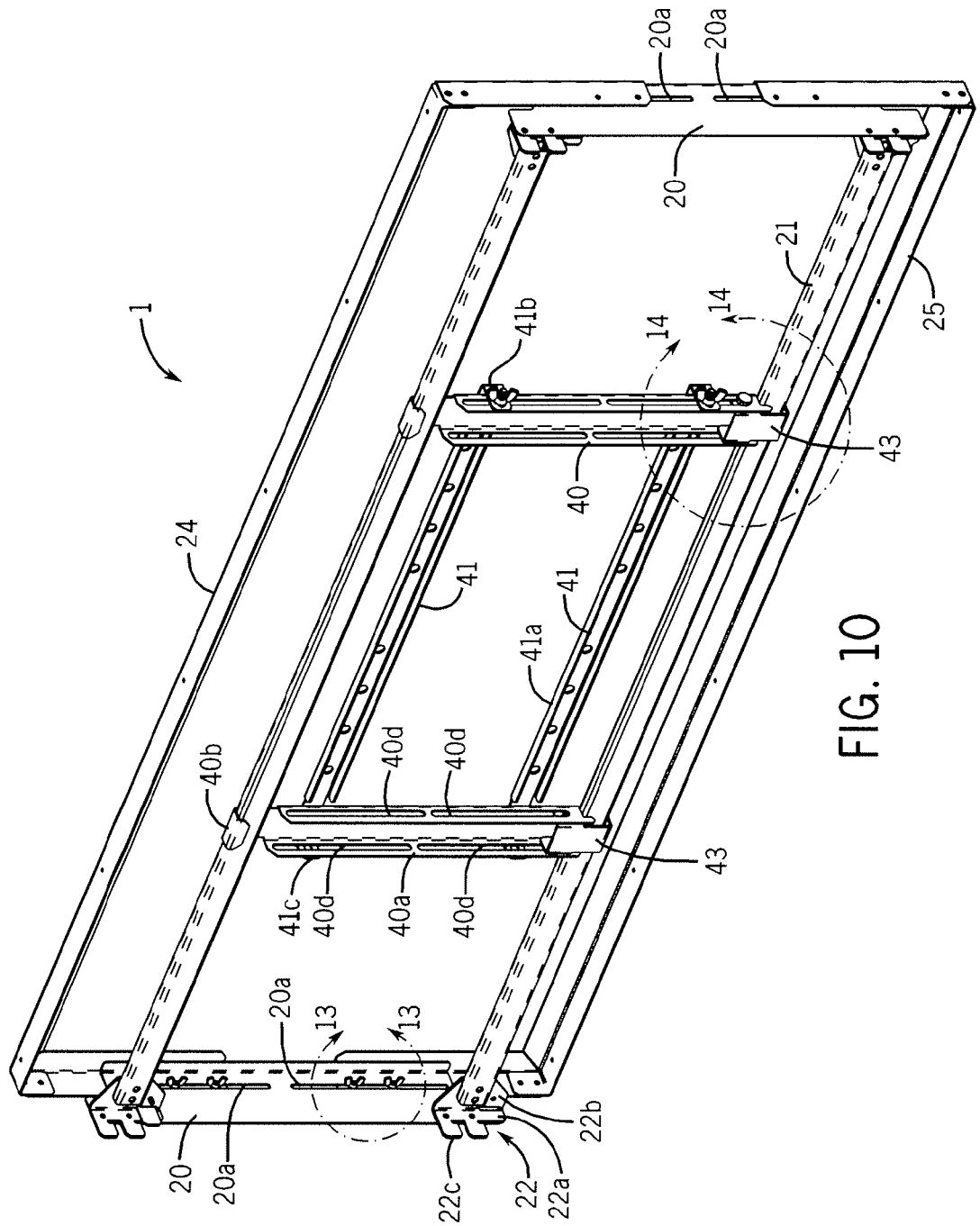
FIG. 10 is a rear perspective view of the mounting assembly of FIG. 9.
Figure 11:
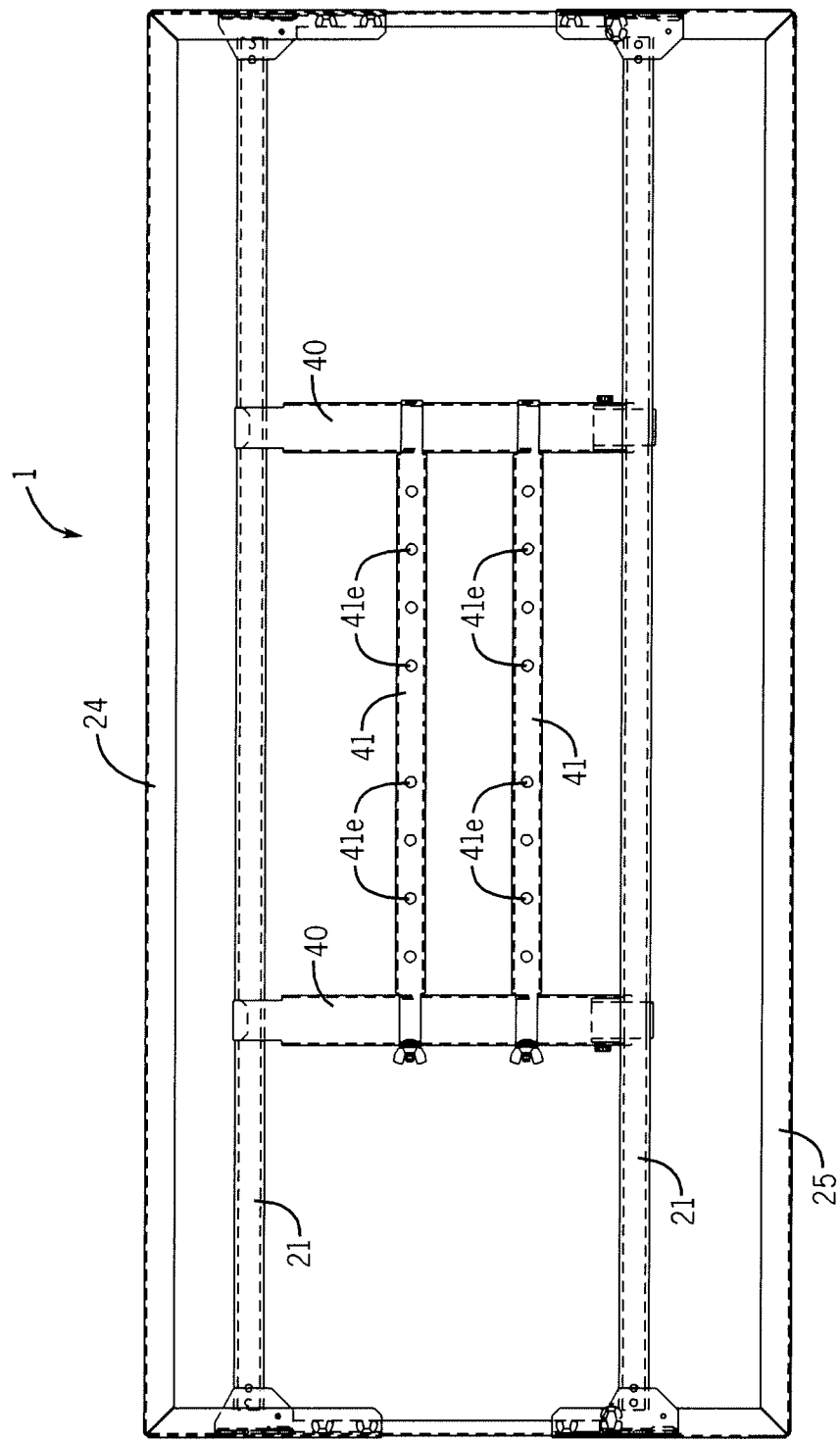
FIG. 11 is a front view of the mounting assembly of FIG. 9.

The corner brackets 22 may be configured to help connect the fixed frame structure together. As shown in FIG. 10, the mounting assembly 1 includes four corner brackets 22 disposed in the respective corners of the mounting assembly 1 between the side members 20 and the cross members 21 to connect the members 20, 21 together. Each corner bracket 22 may have an L-shaped cross section or may have any suitable cross section. The L-shaped corner bracket 22 may be configured to nest with the side member 20, or may be configured such that one side of the L-shaped corner bracket 22 abuts the side member 20. As shown, the corner bracket 22 includes a first portion 22a that is configured to connect to the side member 20, and a second portion 22b that is configured to connect to the cross member 21. For example, the first portion 22a may include one or more openings (e.g., holes) that are configured to receive one or more fasteners to connect the corner bracket 22 to the side member 20, and the second portion 22b may include one or more openings that are configured to receive one or more fasteners to connect the corner bracket 22 to the cross member 21. It should be noted that the fixed frame structure of the frame 2 may be configured having any number of corner brackets 22 or without any corner brackets 22 at all, such as where the side members 20 connect directly to the cross members 21. However, the use of corner brackets 22 may advantageously allow for the frames 2 to be modular. For example, the lengths of the side members and the cross members may be changed to change the overall size of the mounting assembly, yet the different sized mounting assemblies may utilize a common corner bracket.

Figure 28:
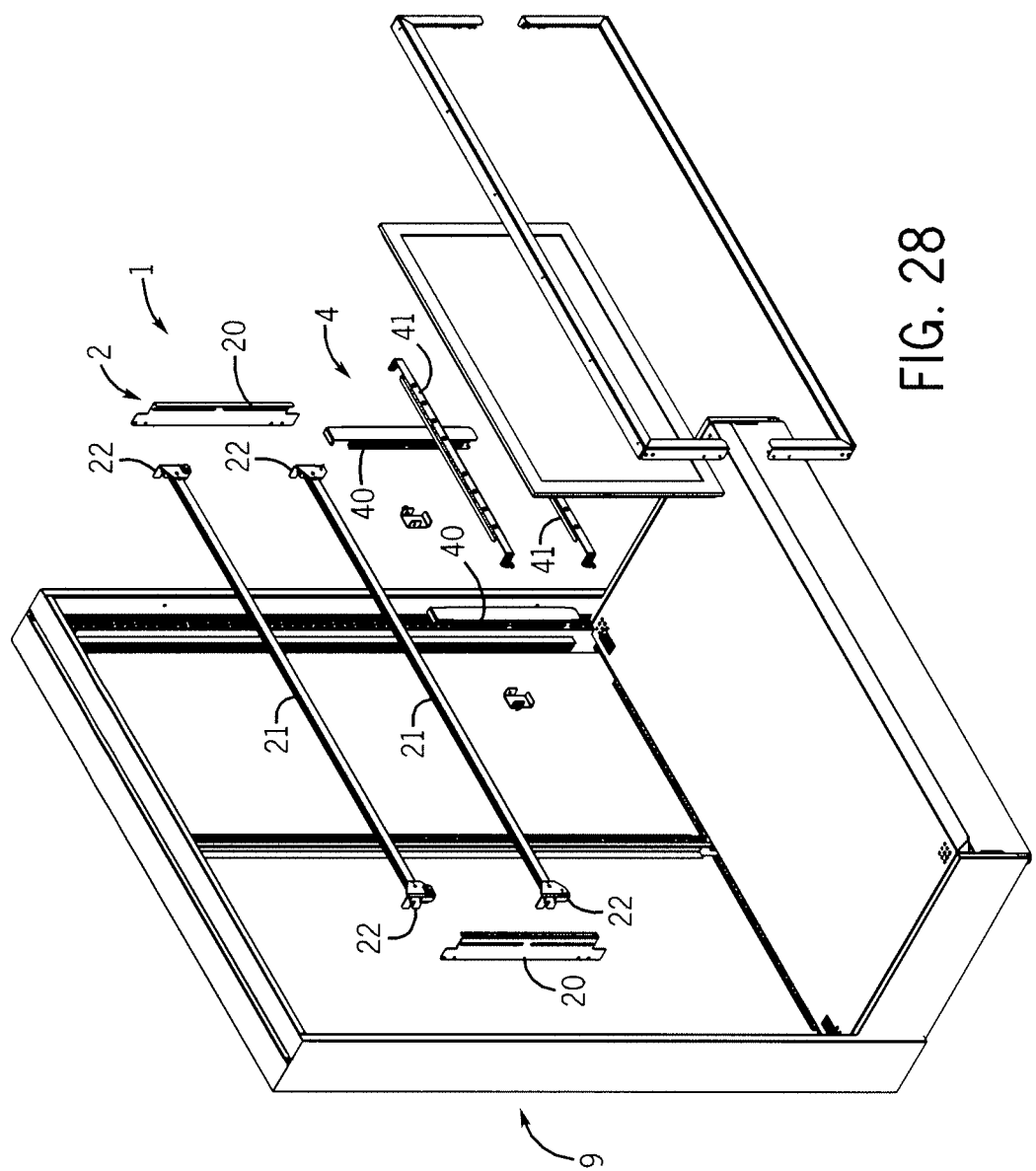
FIG. 28 is an exploded perspective view of another exemplary embodiment of a mounting assembly with a fixture.

The fixed frame structure may also include an attachment feature that is configured to attach the mounting assembly 1 to another object, such as a fixture 9 (shown in FIG. 28). For example, the attachment feature of the frame may be configured to selectively connect or attach to an endcap of a fixture for the device (e.g., audio/video device) to be displayed at the end of the fixture, such as to utilize surface area that was previously devoid of devices. As shown in FIG. 10, the corner bracket 22 includes an attachment feature 22c that is configured to attach the mounting assembly 1 to the fixture 9. The attachment feature 22c may comprise a J-shaped hook that extends from the first portion 22a of the corner bracket 22 to define an elongated opening or slot between the attachment feature 22c and the first portion 22a, where the slot may receive a section of the fixture therein. For example, the hook-shaped attachment features 22c of the corner bracket 22 may be configured to engage slotted openings in the endcap of a fixture, such that a supporting portion of the fixture engages the elongated opening between the attachment feature 22c and the first portion 22a of the corner bracket 22. The corner bracket 22 may also include two attachment features 22c disposed adjacently in a top-to-bottom arrangement, or may include any number of attachment features 22c having any suitable arrangement (e.g., side-to-side). It should be noted that the attachment feature 22c may be configured differently than disclosed herein, where the attachment feature may have any suitable configuration that at least selectively attaches the mounting assembly 1 to another object, such as the fixture 9. Additionally, for the mounting assembly configured without corner brackets, the attachment feature may be provided on the side members, the cross members, a separate member, or a combination thereof.

The support assembly 4 may include one member or a plurality of members that are interconnected, such as through the use of fasteners, welding, a combination thereof, or any suitable method. As shown, the support assembly 4 includes a pair of spaced apart first members 40 (e.g., vertical members) and a pair of spaced part second members 41 (e.g., horizontal members). For example, the first members 40 may be configured to extend in a substantially vertical direction, and the second members 41 may be configured to extend in a substantially horizontal direction. However, it should be noted that the first and second members 40, 41 of the support assembly 4 may extend in any direction, and the first and second members 40, 41 do not have to have to extend precisely vertically and horizontally, respectively. The first members 40 are configured to slide relative to the frame 2, such as along the cross members 21. The second members 41 are configured to set the spacing between the first members 40 and to slide or otherwise move relative to the first members 40 in an upward and downward direction to adjust the spacing between the second members 41. Thus, the support assembly 4 may slide or otherwise move relative to the frame 2 to adjust the position of the support assembly 4 and the audio/visual device 8 mounted thereto, and the second members 41 of the support assembly 4 may move upward and/or downward to adjust the spacing between the second members 41 to accommodate different sized audio/visual devices 8.

Each member (e.g., each first member and second member) of the support assembly 4 may be configured as a flat plate, as a formed member, such as having a non-flat cross section (e.g., C-shaped, U-shaped, L-shaped, box-shaped, etc. cross-sections), or may have any suitable shape and/or configuration. As shown, the first member 40 includes a body 40a having a generally C-shaped cross section in a horizontal plane and two opposing ends extending away from the body 40a, where the first end 40b (e.g., the upper end) has a generally J-shaped cross section in a vertical plane, such as to wrap around a cross member 21, and the second end 40c has a generally flat shape. In other words, the body 40a may include a base and two legs that extend away from the base to slideably couple or otherwise couple the first member 40 to another member (e.g., the cross member 21). It should be noted that the first member 40 may be configured differently, such as having both ends with a similar configuration.

The body 40a of the first member 40 may be configured to connect the first member 40 to the second member 41. For example, the legs of the body 40a may include one or more than one opening 40d that is configured to receive a fastener 47 to connect the first member 40 and the second member 41 together. As shown, the body 40a includes two aligned and elongated openings 40d (for example, slots) in each leg, where each opening 40d provides for an adjustable connection for one of the pair of spaced apart second members 41. Thus, each connected second member 41 is configured to slideably couple to the first member 40 through the respective opening 40d, such as through a fastener 47. The length of the elongated openings 40d may be tailored to provide a desired amount of travel of the second member 41 relative to the first member 40. It should be noted that each leg of the body 40a of the first member 40 may include one elongated opening 40d that extends the length of the two openings shown, or may have any suitable configuration.

As shown, each second member 41 includes a body 41a having a generally C-shaped cross section in a vertical plane and two opposing ends extending away from the body 41a, where the first end 41b (e.g., the upper end) has a generally L-shaped cross section in a horizontal plane and the second end 41c has a generally L-shaped cross section in a horizontal plane. In other words, the body 41a may include a base and two legs that extend away from the base, and the ends may extend away from opposite ends of the base of the body 41a in a symmetrically opposite arrangement. The first end 41b and the second end 41c may be configured to wrap around the first member 40 to facilitate connecting the second member 41 and the first member 40 together. Thus, the first end 41b and the second end 41c of the second member 41 may nest with the body 40a of the first member 40 once the members are connected together. Each of the first end 41b and the second end 41c, such as the base of each end, may include an opening 41d (for example, and elongated opening or slot) that is configured to receive a fastener 47 to connect the second member 41 to the first member 40. The elongated opening 41d in the second member 41 allows for the position of the second member 41 to vary relative to the first member 40, such as in a fore-aft direction (i.e., a direction that is transverse to the sliding direction of the second member 41 relative to the first member 40 along the elongated opening 40*d*).

The second member 41 may also include one or more openings 41*e* that are configured to facilitate mounting an audio/visual device to the support assembly 4. As shown, each second member 41 includes a plurality of circular holes 41*e*, where each hole 41*e* is spaced apart from at least one adjacent hole 41*e* by an offset distance. The offset distance of the plurality of holes 41*e* may be arranged to mount various sizes of audio/visual devices, and the holes 41*e* may have similar or dissimilar offset distances. Furthermore, by adjusting the spacing between the pair of second members 41 relative to each other (i.e., by moving one or both of the second members 41 relative to the first members 40), the support assembly 4 may be adjusted to support mounting different sized audio/visual devices. In other words, the plurality of holes 41*e* allow for different length devices to mount to the support assembly 4 and the adjustability of the second members 41 allow for different height devices to mount to the support assembly 4. It should be noted that the holes 41*e* in the second members 41 may be configured differently. For example, the hole 41*e* may be a slot, more than one slot, or may have any suitable configuration.

Figure 14:
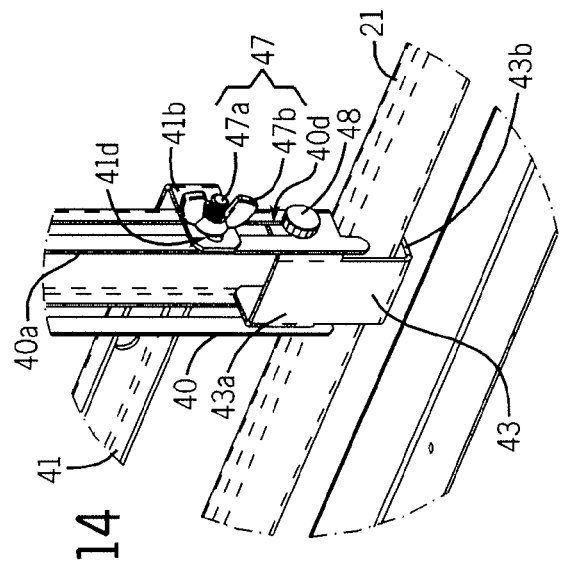
FIG. 14 is another detail view taken from FIG. 10.
Figure 12:
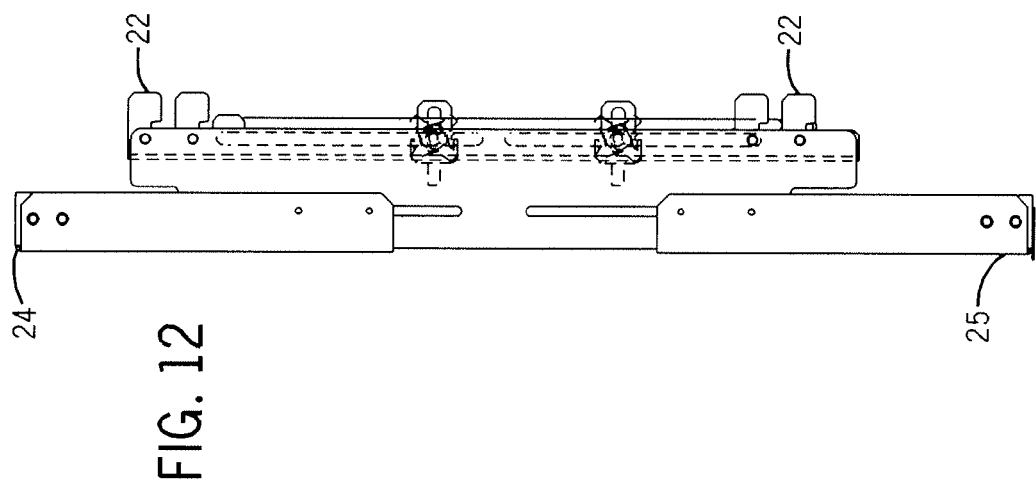
FIG. 12 is a right-side view of the mounting assembly of FIG. 9.

As shown in FIG. 14, the fastener 47 configured to connect the support assembly 4 together, such as to interconnect the first members 40 and second members 41, includes a bolt 47*a* and a nut 47*b* that are configured to be connected through a threaded engagement. The head of the bolt 47*a* may abut the body 40*a* of the first member 40 and the shank of the bolt 47*a* may pass through the opening 40*d* in the first member 40 and the opening 41*d* in the second member 41 to thread to the nut 47*b* to clamp the first member 40 and second member 41 together. The fastener 47 may be loosened, such as to allow adjustment of the second member 41 relative to the first member 40, then may be retightened once the desired position of the second member 41 (relative to the first member 40) is achieved. It should be noted that the support assembly 4 may utilize any other suitable fastener, or any other suitable connection to assembly the members together. For example, the second members may be welded to the first members to form a fixed size support assembly.

The support assembly 4 may also include a lower member 43 to help slideably couple the support assembly 4 to the frame 2. For example, the lower member 43 may help slideably couple the first member 40 to the cross member 21. As shown in FIG. 14, the lower member 43 includes a body 43*a* and an end 43*b*. The body 43*a* of the lower member 43 may have a C-shaped cross section (in a horizontal plane) that is configured to nest with (e.g., inside) the C-shaped body 40*a* of the first member 40. The end 43*b* of the lower member 43 may extend away from the body 43*a* and may have an L-shaped cross section (in a vertical plane) where the end 43*b* wraps around the cross member 21 of the frame. The end 43*b* may also engage an end (e.g., the end 40*c*) of the first member 40 to form a generally rectangular opening between the lower member 43 and the first member 40 for the cross member 21 to slide therein. As shown in FIG. 14, the body 43*a* also includes holes, such as in the legs of the C-shaped body 43*a*, where a fastener 48 may engage a hole in body 43*a* to couple the respective lower member 43 and the first member 40 together. It should be noted that the lower member 43 may be coupled to the first member 40 using any suitable method, such as welding.

Figure 15:
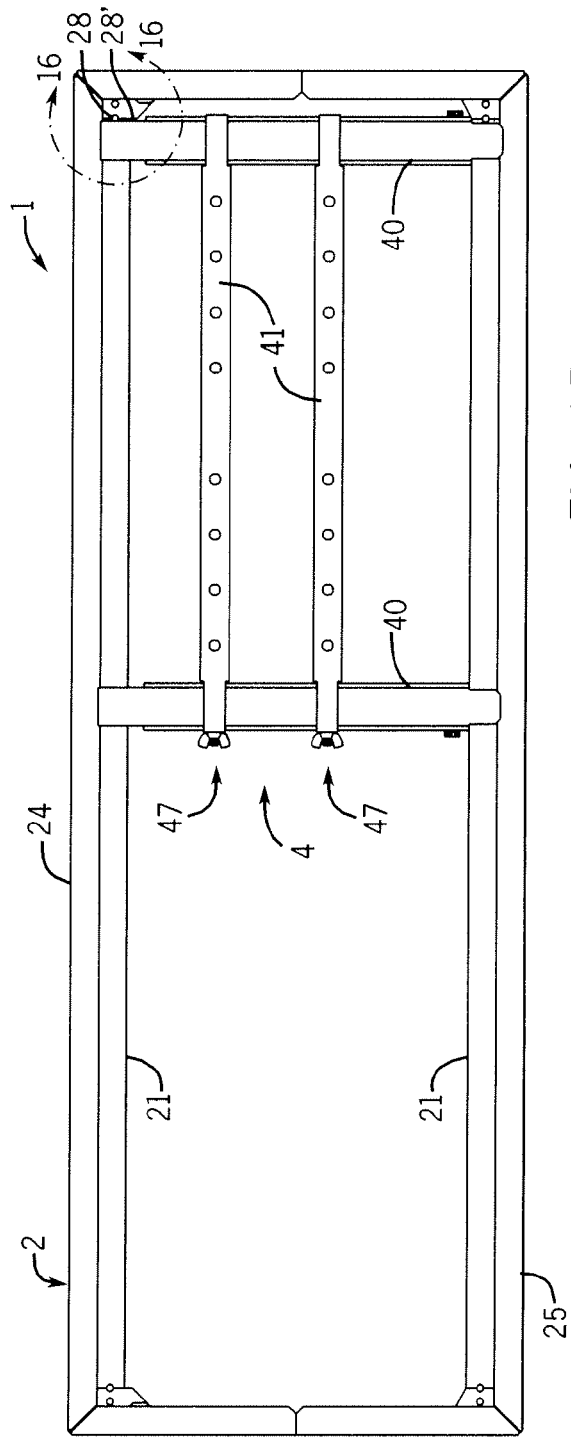
FIG. 15 is a front view of the mounting assembly of FIG. 1 shown is a collapsed and adjusted configuration.

The support assembly 4 may slide relative to the frame 2, such as laterally, between a first position and a second position. As shown in FIG. 15, in the first position, the support assembly 4 is positioned fully to a first side (e.g., right side) of the frame 2. In the second position, the support assembly 4 is positioned fully to the opposing side (e.g., left side) of the frame 2. Accordingly, the support assembly 4 may also be positioned at any location between the first and second positions relative to the frame 2. This adjustability of the support assembly 4 relative to the frame 2 allows the audio/visual device mounted to the support assembly 4 to be positioned at different locations, such as to improve viewing of the device. Additionally, once the mounting assembly 1 is assembled, the support assembly 4 may be moved relative to the frame 2 without the use of tools or having to loosen any fastening device. The audio/visual device and/or the support assembly 4 may be moved relative to the frame 2 until the desired position is achieved, and the position may be maintained, such as through friction induced by the weight of the assembly.

Figure 16:
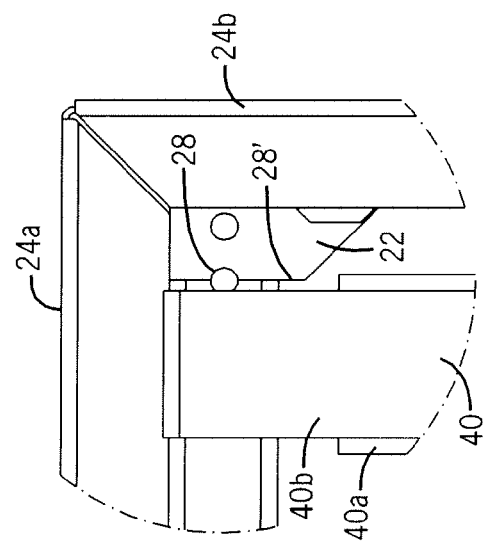
FIG. 16 is a detail view taken from FIG. 15.
Figure 17:
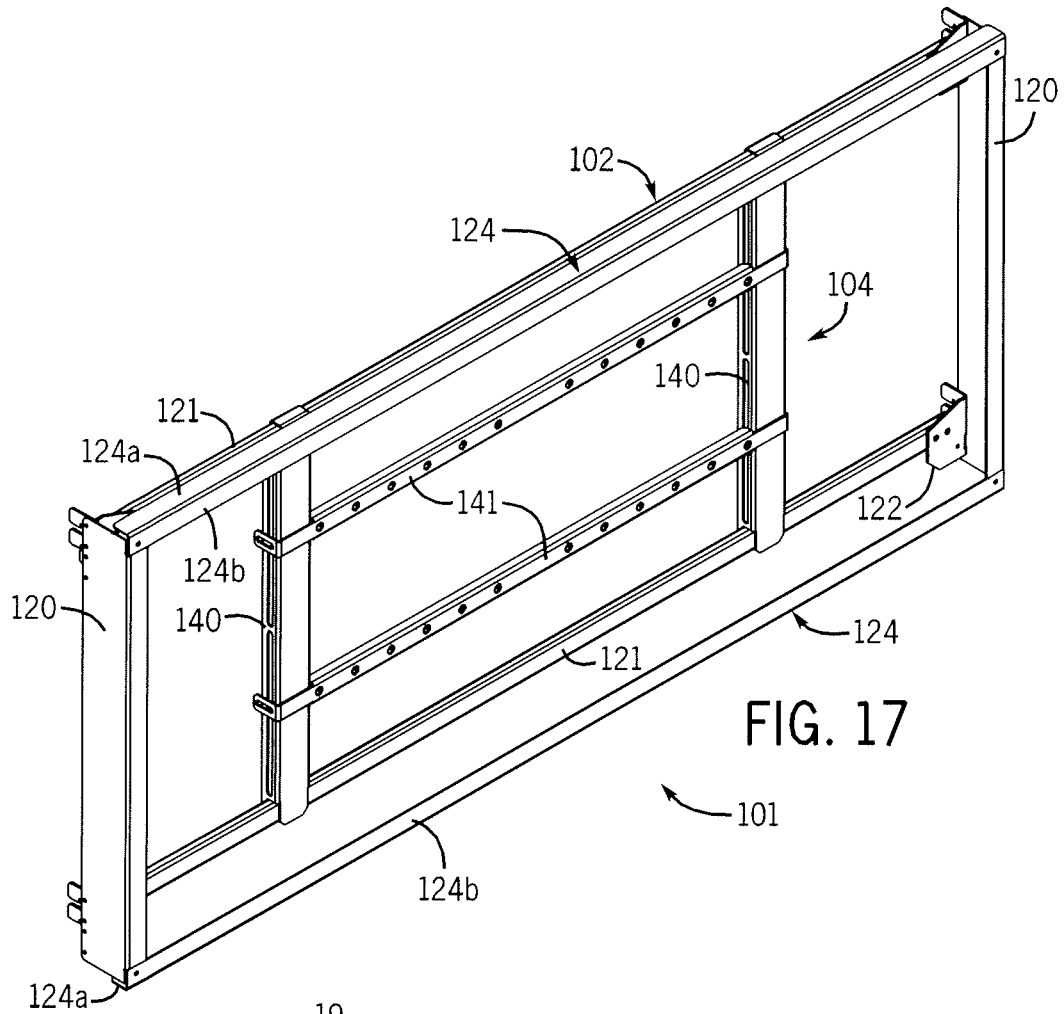
FIG. 17 is a front perspective view of another exemplary embodiment of a mounting assembly.
Figure 18:
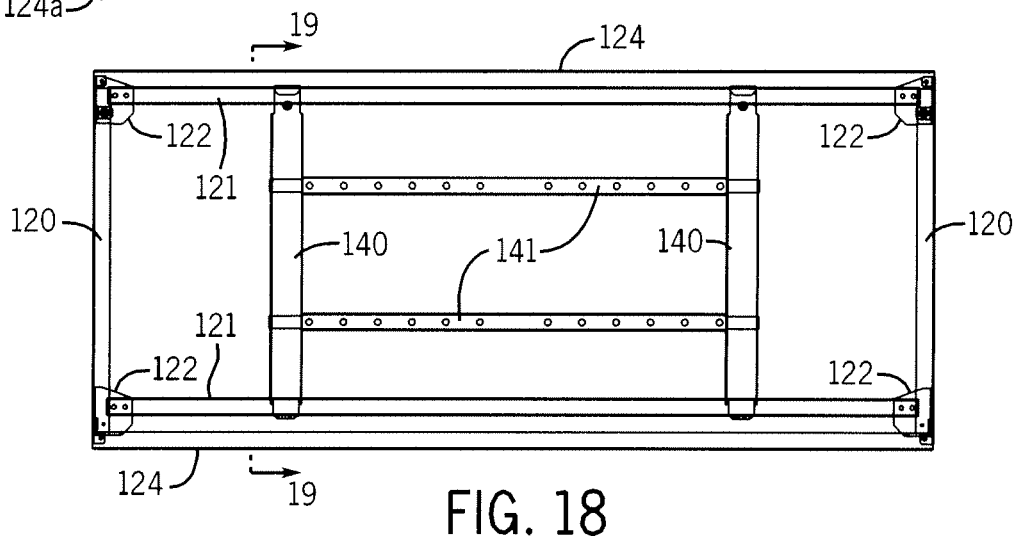
FIG. 18 is a front view of the mounting assembly of FIG. 17.
Figure 21:
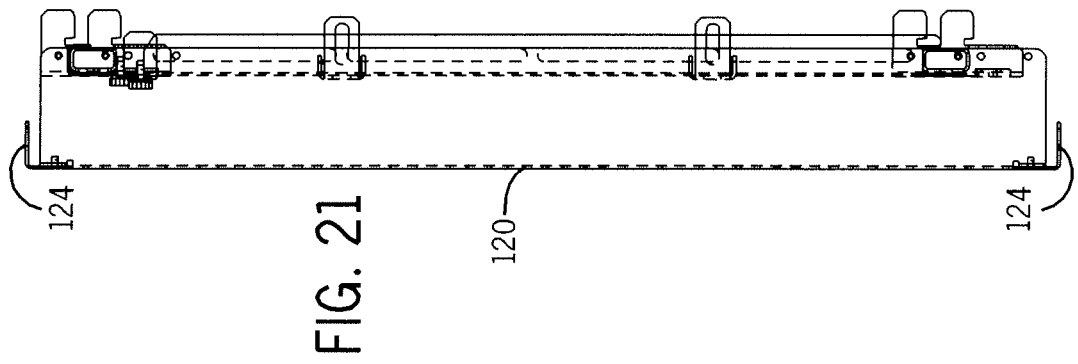
FIG. 21 is a right-side view of the mounting assembly of FIG. 17.

The frame 2 may also include a stop that limits the movement of the support assembly 4 relative to the frame 2. As shown in FIGS. 15 and 16, the frame 2 includes a stop 28 configured as a stud or fastener, which is configured to limit the travel of the support assembly 4, such as by contacting the first member 40. It should be noted that the stop (of the frame 2) may have any suitable configuration. For example, the frame 2 may utilize an edge of one or more than one member (for example, the corner bracket 22) as the stop 28 to limit the travel of the support assembly 4.

Figure 29:
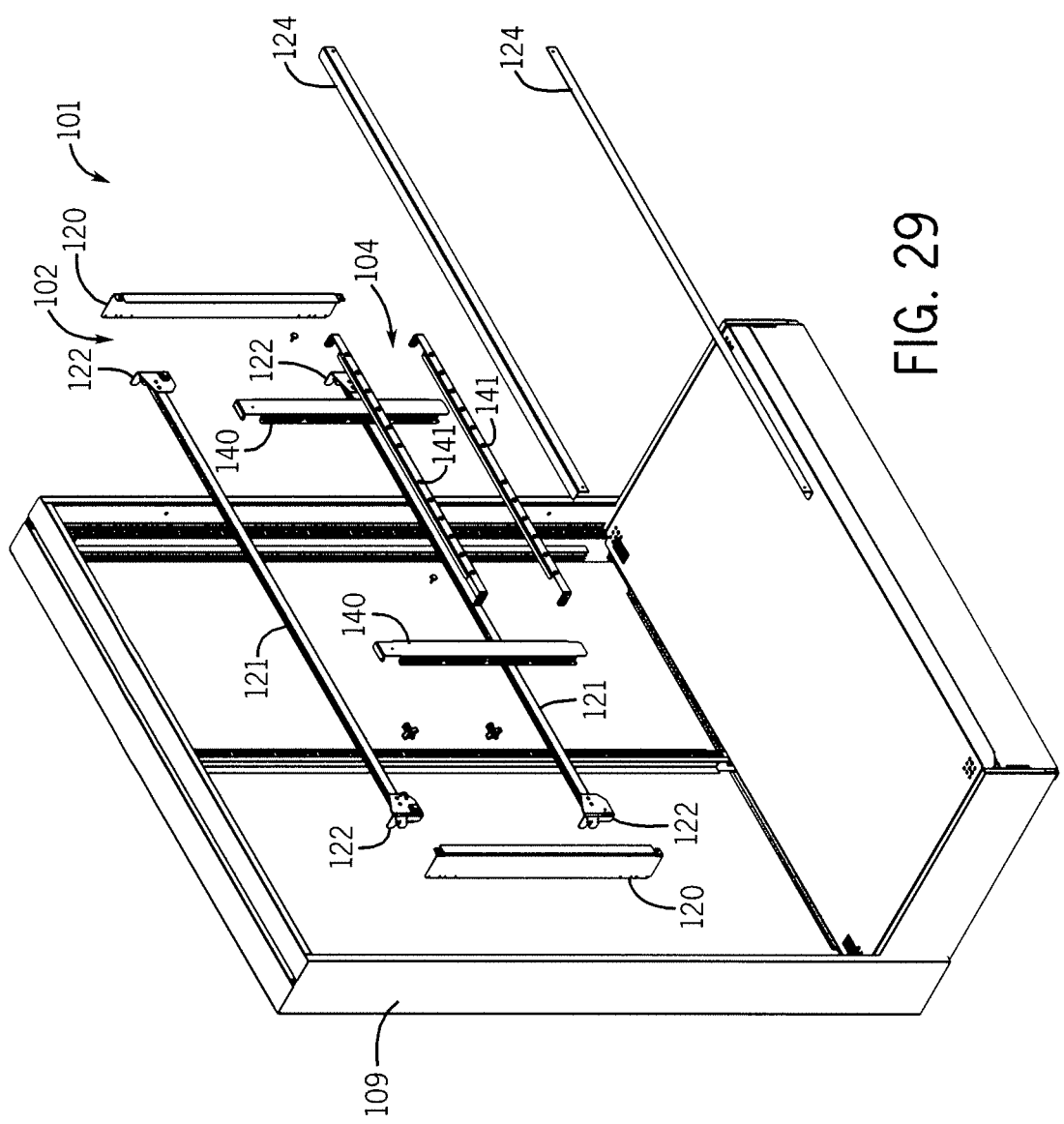
FIG. 29 is an exploded perspective view of another exemplary embodiment of a mounting assembly with a fixture.

FIGS. 17-21 illustrate another exemplary embodiment of a mounting assembly 101 that is configured to support a display device (e.g., an audio/visual device). For example, the mounting assembly 101 may be attached (e.g., coupled, connected) to the fixture 109 shown in FIG. 29, where the mounting assembly 101 supports an audio/visual device (not shown).

As shown in FIGS. 17-21, the mounting assembly 101 includes a frame 102 and a support assembly 104, where the frame 102 is configured to attach to an object (e.g., the fixture 109) to support the mounting assembly 101, and where an audio/visual device is configured to mount to the support assembly 104. The support assembly 104 may be movable relative to the frame 102, such as to change the relationship between the audio/visual device and the frame 102. For example, the support assembly 104 may be configured to slide in a lateral direction between two opposing ends of the frame 102, such as to adjust the position of the audio/visual device coupled to the support assembly 104 relative to the frame 102 (and fixture 109).

The frame 102 is configured to be a fixed frame (i.e., non expandable) and includes a plurality of members that are interconnected, such as through the use of fasteners, welding, a combination thereof, or any suitable method. As shown, the frame 102 includes a pair of opposing side members 120 (e.g., vertical members) coupled to a pair of opposing cross members 121 (e.g., horizontal members), such as through corner brackets 122, to form a generally rectangular shaped fixed frame structure. The side members 120, cross members 121, and/or corner brackets 122 may be configured as described above, or may be configured differently having any suitable configuration. The frame 102 may also include a second pair of opposing cross members 124 that are connected to the side members 120. The second pair of cross members 124 may be connected to the side members 120 forward of the first pair of cross member 121, such as to form a front frame structure, which may receive a cover, such as a cover described below.

Each second cross member 124 may be configured having any suitable shape, such as having an L-shaped cross section in a vertical plane with a base 124*a* and a leg 124*b*, where the base 124*a* is adjacent to or abutting an edge of the side member 120 and the leg 124b is adjacent to or abutting a front surface of the side member 120. It should be noted that the second cross member 124 is an optional member and may be used, for example, to increase the structural rigidity of the fixed frame 102.

The support assembly 104 may be configured as described above or differently. For example, the support assembly 104 may include a pair of spaced apart first members 140 interconnected with a pair of spaced apart second members 141, where the second members 141 may be configured to slide or otherwise move upwardly and downwardly relative to the interconnected first members 140. The first members 140 and the second members 141 may have any suitable configuration, such as, for example, as described above for the respective first members 40 and second members 41 of the support assembly 4.

Figure 20B:
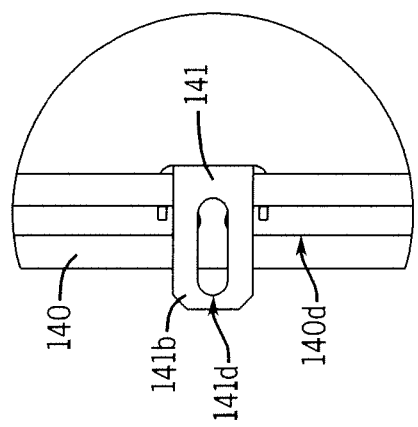
FIG. 20B is a detail view taken from FIG. 19 showing a second configuration.
Figure 20A:
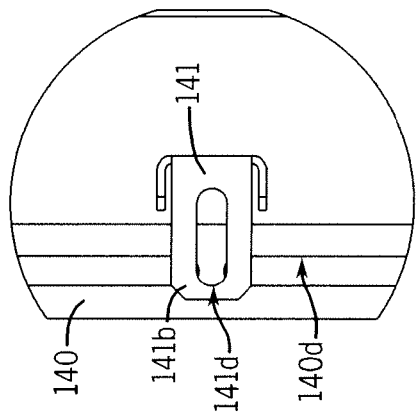
FIG. 20A is a detail view taken from FIG. 19 showing a first configuration.
Figure 19:
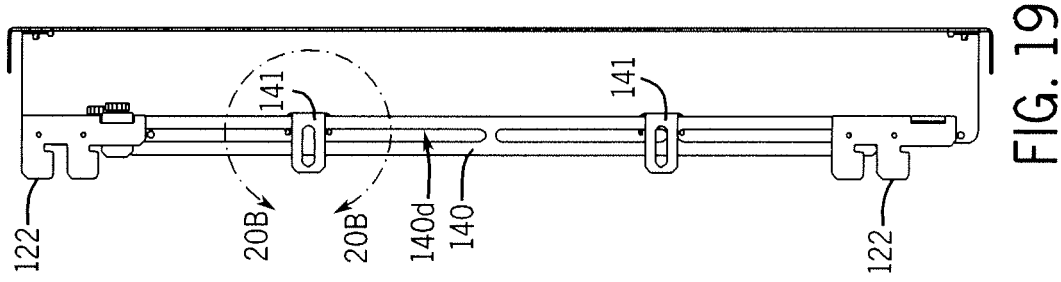
FIG. 19 is a section view taken along line 19-19 of FIG. 18.

FIGS. 19-20B illustrate the adjustability of the second members 141 relative to the first members 140, such as by utilizing similar configurations (which may have different sizes and/or shapes) as described above for the first members 40 and second members 41 of the support assembly 4. An end 141b of the second member 141 includes an elongated hole 141d that is configured to overlap with an transversely aligned elongated hole 140d in the first member 140 to provide a relative relationship between the second member 141 and the first member 140 that may be varied. As shown in FIG. 20A, the second member 141 may have a first position that has a first offset distance (0.628 inches in one particular embodiment) from the first member 140, and may have a second position that has a second offset distance (0.075 inches in a particular embodiment) from the first member 140. Accordingly, in both the first and second positions (and in any position in between) the opening 141d in the second member 141 may overlap with the opening 140d in the first member 140 to allow the members 140, 141 to be coupled together.

FIGS. 22-27 illustrate another exemplary embodiment of a mounting assembly 201 that is configured to support a display device (e.g., an audio/visual device). For example, the mounting assembly 201 may be attached (e.g., coupled, connected) to the fixture 209 shown in FIG. 22, where the mounting assembly 201 supports an audio/visual device 208.

As shown in FIGS. 22-27, the mounting assembly 201 includes a frame 202, a support assembly 204, and a cover 205. The frame 202 is configured to attach to an object (e.g., the fixture 209, the cover 205) to support the support assembly 204 and the cover 205. An audio/visual device is configured to mount to the support assembly 204, and the cover 205 may be attached to the support assembly 204 to cover the structure while allow viewing of the audio/visual device. The cover 205 may also protect the audio/visual device, such as, by having a see-through protective element that covers the device. Accordingly, the cover 205 may improve the aesthetics and/or improve the functionality of the mounting assembly 201. The support assembly 204 may be movable relative to the frame 202, such as to change the relationship between the audio/visual device and the frame 202. For example, the support assembly 204 may be configured to slide in a lateral direction between two opposing ends of the frame 202, such as to adjust the position of the audio/visual device coupled to the support assembly 204 relative to the frame 202 and the fixture 209.

The support assembly 204 may have any suitable configuration, which may be similar to or different from the support assemblies disclosed herein. For example, the support assembly 204 may include a pair of spaced apart first members 240 interconnected with a pair of spaced apart second members 241, where the second members 241 may be configured to slide or otherwise move upwardly and downwardly relative to and along the interconnected first members 240. The first members 240 and the second members 241 may have any suitable configuration, such as, for example, as described above for the respective members 40, 41 of the support assembly 4.

The frame 202 may have any suitable configuration, which may be similar to or different from the frames disclosed herein. The frame 202 may be a fixed frame or an expandable frame, although if the frame is a fixed frame, then the cover 205 may wrap closely around the frame 202, since it does not have to accommodate expansion of the frame 202 to minimize the overall packaging volume of the assembly. The frame 202 may include a member or a plurality of interconnected members through any suitable method, such as through the use of fasteners, welding, or a combination thereof.

Figure 22:
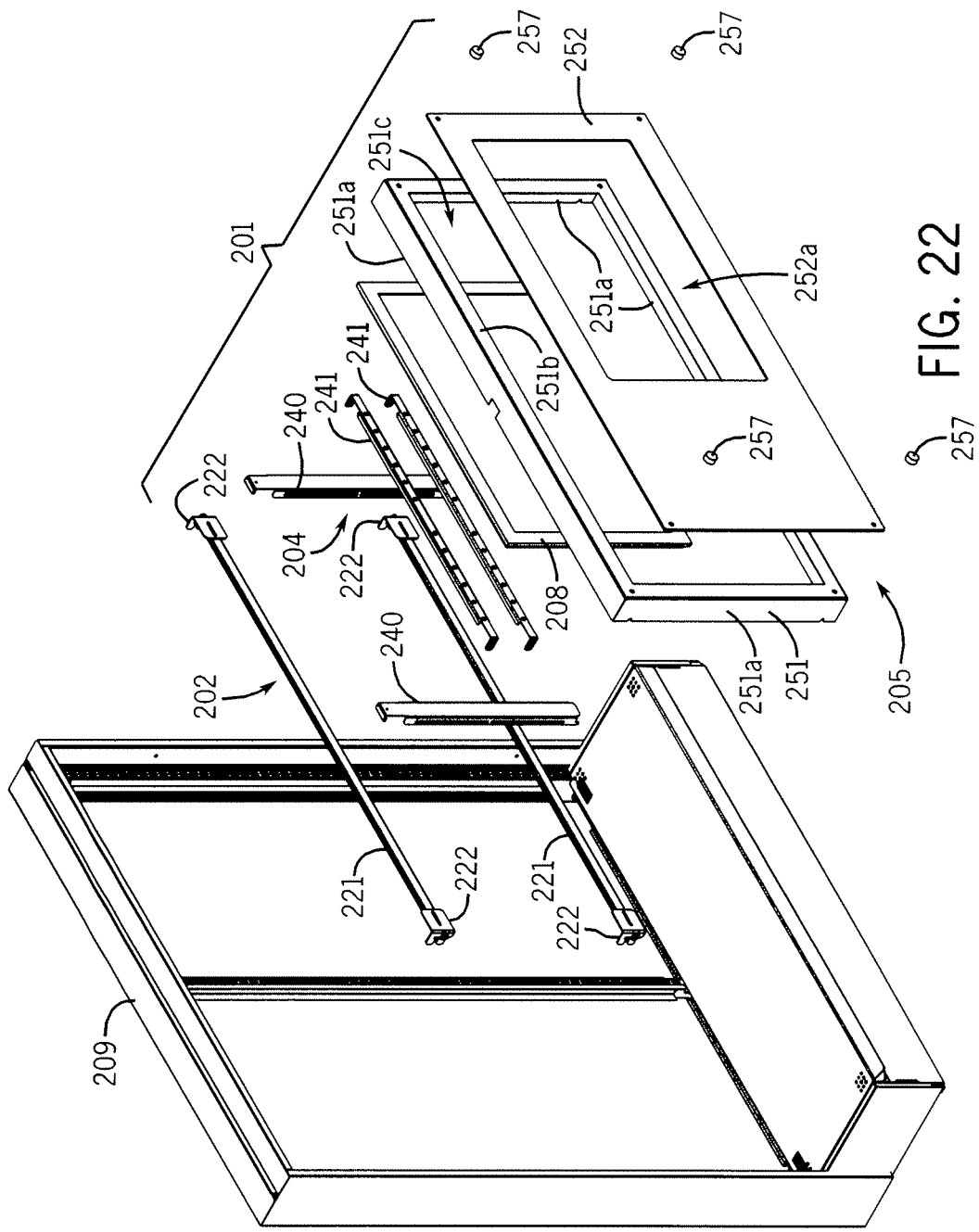
FIG. 22 is an exploded perspective view of an exemplary embodiment of a mounting assembly with a fixture.
Figure 24:
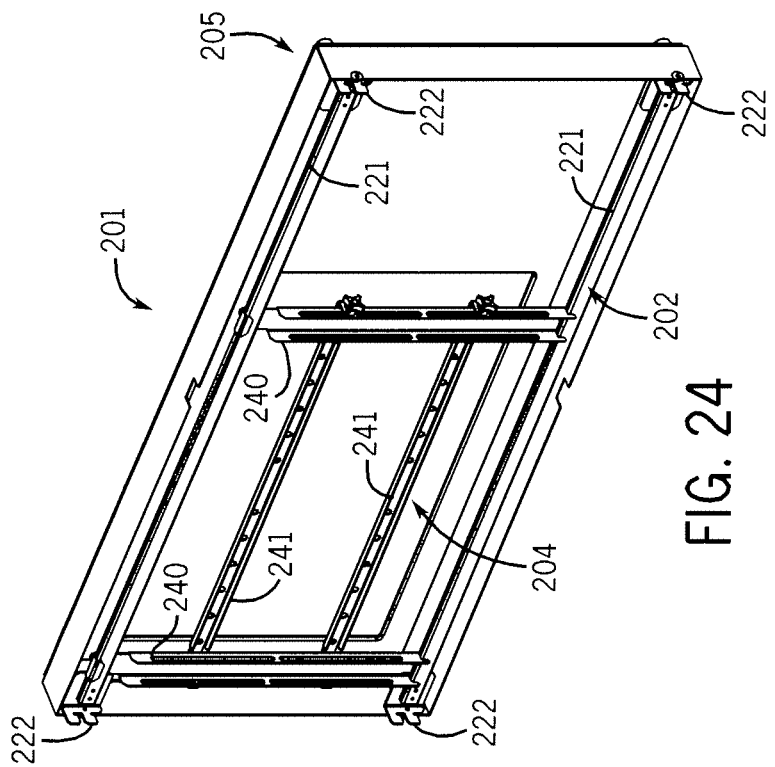
FIG. 24 is a rear perspective view of the mounting assembly of FIG. 22.
Figure 23:
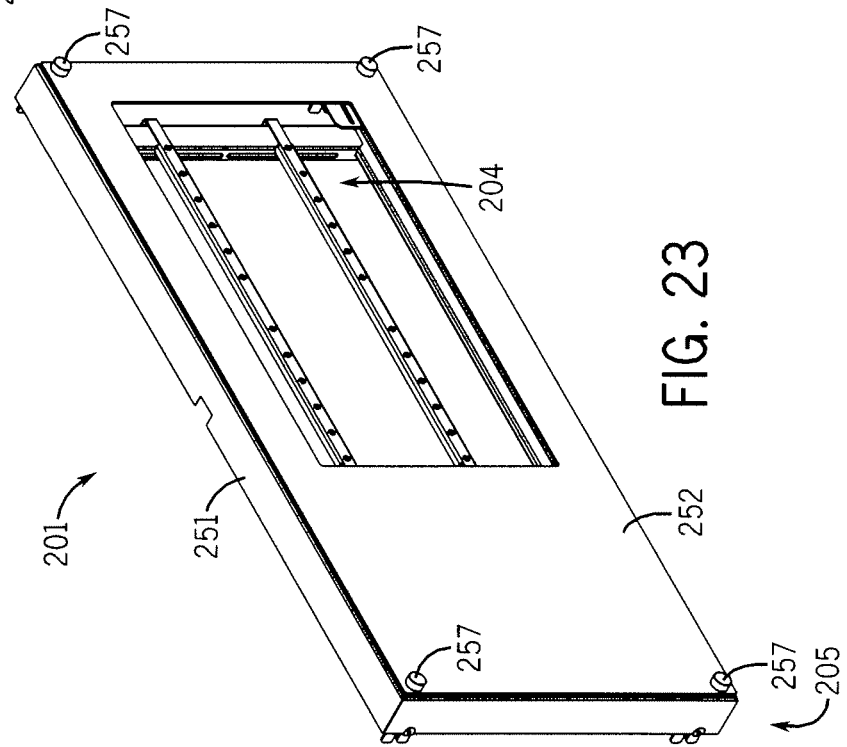
FIG. 23 is a front perspective view of the mounting assembly of FIG. 22.
Figure 25:
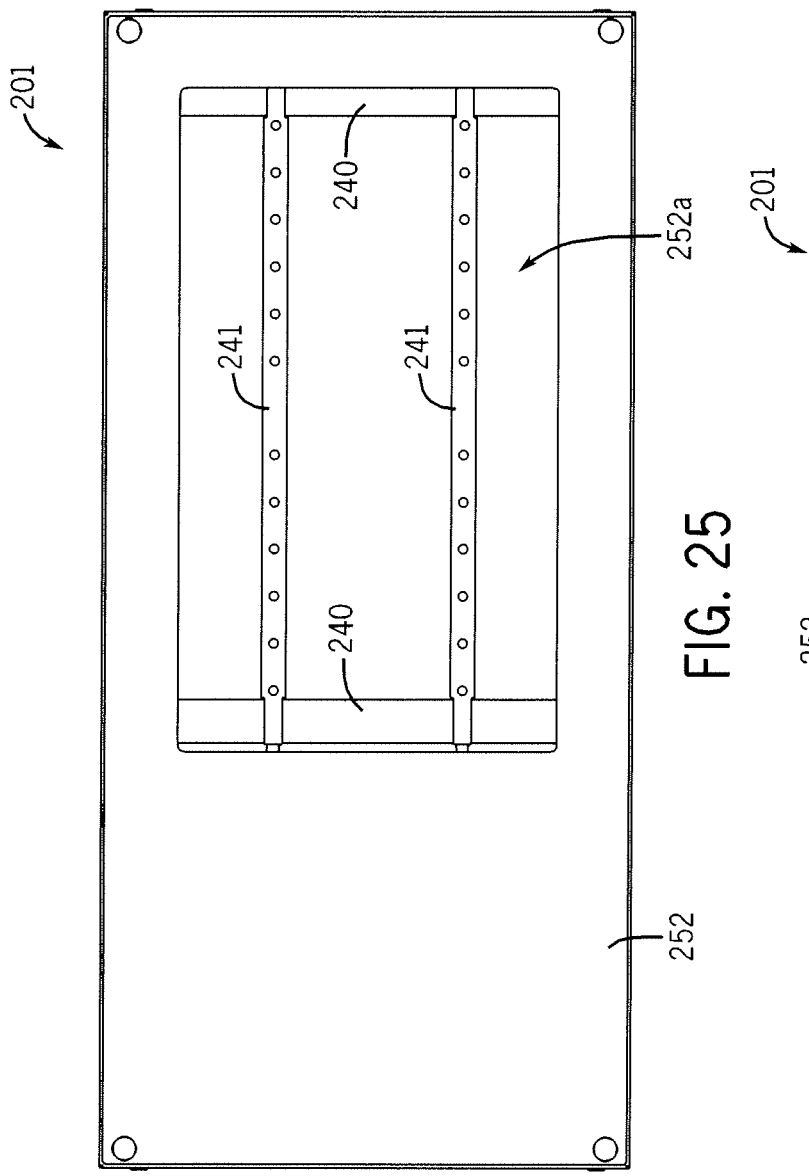
FIG. 25 is a front view of the mounting assembly of FIG. 22.
Figure 27:
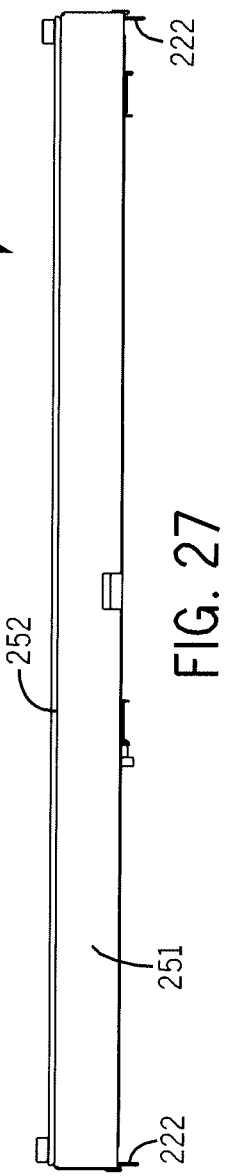
FIG. 27 is a right-side view of the mounting assembly of FIG. 22.
Figure 26:
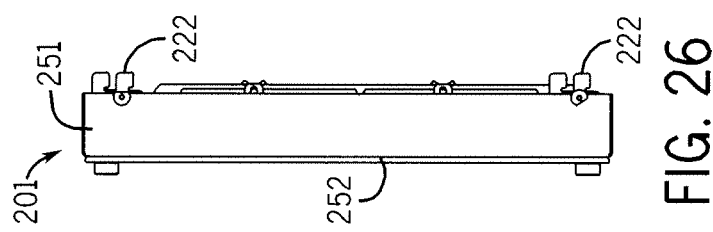
FIG. 26 is a bottom view of the mounting assembly of FIG. 22.

As shown in FIG. 22, the frame 202 includes a pair of spaced apart cross members 221 and four corner brackets 222 configured to couple the cross members 221 to another object, such as directly to the fixture 209 or to the cover 205, where each end of each cross member 221 includes a corner bracket 222 coupled thereto. Accordingly, the frame 202 is configured without side members. It should also be noted that the frame 202 may be configured such that the cross members 221 couple directly to another object (for example, the cover 205 and the fixture 209), without the use of the corner brackets 222. The spacing between the cross members 221 may be tailored to accommodate various sizes of mounting assemblies 201 and/or audio/visual devices.

The cross members 221 and/or the corner brackets 222 may be configured having any suitable configuration, which may be similar to or different from those disclosed herein. The cross members 221 may be configured to structurally support and guide the movement of the support assembly 204. The corner brackets 222 may include attachment features that are configured to attach the mounting assembly 201 to another object, such as to the fixture 209.

The cover 205 may cover all or part of the frame 202 and/or the support assembly 204, or any portion of the mounting assembly 201. As shown, the cover 205 includes a first cover portion 251 and a second cover portion 252 that are connected together through any suitable method, such as through a plurality of fasteners 257. The first cover portion 251 has a generally rectangular shape with an open back and an opening in the front. The first cover portion 251 may have any suitable shape or cross section, such as having an L-shaped cross section. In other words, the first cover portion 251 includes two sets of side walls 251a and a front wall 251b with an opening 251c therein, wherein the each of side walls 251a are configured to be substantially parallel to one another and substantially perpendicular to the walls 251a of the other set of side walls 251a. The front wall 251b may includes apertures (e.g., holes) for receiving the fasteners 257 to connect the first cover portion 251 and the second cover portion 252 together. The second cover portion 252 may be configured as a relatively flat plate having an opening 252a therein, which may be sized according to the size of the audio/visual device being mounted to the mounting assembly 201. The opening 252a may be disposed centrally, may be disposed closer to one of the ends, or may be disposed anywhere in the second cover portion 252. The opening 252a may have any suitable shape, such as being rectangular. The second cover portion 252 may also include a see-through protective element that covers the opening 252a to allow visibility of the audio/visual device, while protecting the device, such as from impacts from other objects. The second cover portion 252 may also include holes or other apertures for receiving the fasteners 257 to couple the second cover portion 252 to the first cover portion 251.

As shown in FIGS. 23-27, during assembly of the mounting assembly 201, the first cover portion 251 may be connected to the frame 202 and the support assembly 204 may be movably coupled to the frame 202. Then, the position of the support assembly 204 may be adjusted to a desired location relative to the frame 202 (and the first cover portion 251), such as moved off from center to one side, then an audio/visual device (not shown) can be mounted to the support assembly 204. Then the second cover portion 252 of the cover 205 may be coupled to the first cover portion 251, such as to help protect the audio/visual device.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the mounting systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. Additionally, while certain components are shown with broken lines, meaning that no specific length is required for the component, this should not be interpreted to mean that any other components must be of a particular length unless specifically indicated as such. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A mounting assembly for attaching and supporting an audio/visual device, the mounting assembly comprising:
   a frame including at least two cross members, at least two side members, and a moving member, wherein each cross member is coupled to both side members; and
   a support assembly including a pair of spaced apart first members and a pair of spaced apart second members, each second member being attachable to the audio/visual device;
   wherein each first member is movably coupled to the at least two cross members and each second member is movably coupled to both of the first members, such that movement of the first members moves the second members; and
   wherein the moving member is configured to move relative to the cross and side members, such that the size of the frame is adjustable.

2. The mounting assembly of claim 1, further comprising a corner bracket configured to couple each cross member to each side member.

3. The mounting assembly of claim 2, wherein each corner bracket includes an attachment feature that is configured to attach the mounting assembly to an endcap of a fixture.

4. The mounting assembly of claim 1, wherein the support assembly includes a second moving member that is configured to move relative to the cross and side members, such that the size of the frame is adjustable.

5. The mounting assembly of claim 4, wherein the first and second moving members are movably coupled to opposing ends of the at least two side members, such that first and second moving members move in opposite directions to expand the frame and move toward one another to collapse the frame.

6. The mounting assembly of claim 1, wherein the support assembly further includes a lower member coupled to each first member, such that the lower member wraps around the at least one cross member to movably couple the first and lower members to the at least one cross member.

7. The mounting assembly of claim 1, wherein the first members have at least one elongated opening to movably couple the second member thereto.

8. A mounting assembly for attaching and supporting an audio/visual device, the mounting assembly comprising:
   a frame including a pair of spaced apart cross members interconnected with a pair of spaced apart side members; and
   a support assembly including a pair of spaced apart first members and a pair of spaced apart second members, each second member having at least one opening for attaching the audio/visual device thereto;
   wherein the first members are substantially parallel to the side members and movably coupled to the cross members; and
   wherein the second members are substantially parallel to the cross members and movably coupled to the first members.

9. The mounting assembly of claim 8, further comprising four corner brackets, wherein each corner bracket is configured to connect an end of one of the cross members to one of the side members.

10. The mounting assembly of claim 9, wherein each corner bracket includes an attachment feature that is configured to attach the mounting assembly to an endcap of a fixture.

11. The mounting assembly of claim 8, wherein the support assembly further includes a lower member coupled to each first member to movably couple the first and lower members to the cross members.

12. The mounting assembly of claim 11, wherein each lower member wraps around the cross member to from an opening defined by both the lower and first members, the opening being configured to receive the cross member therein.

13. The mounting assembly of claim 8, further comprising a cover that is configured to surround at least a portion of the frame.

14. The mounting assembly of claim 13, wherein the cover includes a first portion and a second portion, the first portion being configured to surround at least a portion of the frame and the second portion being configured to connect to the first portion to cover at least a portion of the support assembly.

15. A mounting assembly for attaching to an endcap of a fixture and for supporting an audio/visual device mounted thereto, the mounting assembly comprising:
   a frame including a pair of spaced apart cross members;
   a support assembly including:
     a pair of spaced apart first members, and
     a pair of spaced apart second members, each second member being attachable to the audio/visual device,
     wherein the first members are movably coupled to the cross members and the second members are movably coupled to the first members;
   a pair of opposing moving members movably coupled to the frame, wherein each moving member is movable away from and toward the other moving member relative to the frame; and
   a cover configured to at least partially surround the mounting assembly;
   wherein the cross members are directly connected to the cover; and
   wherein the cover includes a first portion and a second portion, the first portion being configured to at least partially surround mounting assembly and the second portion being configured to connect to the first portion to cover at least a portion of the support assembly.

16. A mounting assembly for attaching to an endcap of a fixture and for supporting an audio/visual device mounted thereto, the mounting assembly comprising:
   a frame including a pair of spaced apart cross members;
   a support assembly including:
     a pair of spaced apart first members, and
     a pair of spaced apart second members, each second member being attachable to the audio/visual device,
     wherein the first members are movably coupled to the cross members and the second members are movably coupled to the first members;
   a pair of opposing moving members movably coupled to the frame, wherein each moving member is movable away from and toward the other moving member relative to the frame; and
   a corner bracket coupled to each end of each cross member, wherein the frame also includes a pair of spaced apart side members that are interconnected with the cross members, and wherein each side member includes first and second slots for movably coupling each moving member to the side member.

17. The mounting assembly of claim 16, wherein the corner bracket includes an attachment feature that is configured to attach the mounting assembly to the endcap of the fixture by engaging a slot in the endcap.

18. A mounting assembly for attaching to an endcap of a fixture and for supporting an audio/visual device mounted thereto, the mounting assembly comprising:
   a frame including a pair of spaced apart cross members;
   a support assembly including:
     a pair of spaced apart first members, and
     a pair of spaced apart second members, each second member being attachable to the audio/visual device,
     wherein the first members are movably coupled to the cross members and the second members are movably coupled to the first members; and
   a pair of opposing moving members movably coupled to the frame, wherein each moving member is movable away from and toward the other moving member relative to the frame, and wherein the support assembly further includes a lower member coupled to each first member to movably couple the first member to one of the cross members.

19. The mounting assembly of claim 18, wherein the lower member wraps around the cross member to form an opening defined by both the lower and first members, the opening being configured to receive the cross member therein.

* * * * *

UNITED STATES PATENT AND TRADEMARK OFFICE
CERTIFICATE OF CORRECTION

Page 1 of 1

PATENT NO. : 9,146,001 B2
APPLICATION NO. : 13/449910
DATED : September 29, 2015
INVENTOR(S) : Matthew W. Stifal and James D. Walters It is certified that error appears in the above-identified patent and that said Letters Patent is hereby corrected as shown below:

In the Claims

Column 13, claim 12, line 13, "from" should be --form--.

Signed and Sealed this
Fifteenth Day of March, 2016

Michelle K. Lee
*Director of the United States Patent and Trademark Office*